Jan. 25, 1966 J. F. MARTIN ETAL 3,231,765

PULSE WIDTH CONTROL AMPLIFIER

Filed Oct. 9, 1963

INVENTORS.
JOSEPH F. MARTIN
FRANK NIERTIT
BY Samuel R. Genca
AGENT

United States Patent Office 3,231,765

Patented Jan. 25, 1966

3,231,765

PULSE WIDTH CONTROL AMPLIFIER

Joseph F. Martin, Webster, and Frank Niertit, West Webster, N.Y., assignors to General Dynamics Corporation, Rochester, N.Y., a corporation of Delaware Filed Oct. 9, 1963, Ser. No. 314,901
4 Claims. (Cl. 307—88.5)

The present invention relates to pulse shaping circuitry and, more particularly, to a pulse width control amplifier for generating a very high frequency train of identical pulses of a predetermined duration.

The need for producing a very high frequency pulse train of identical pulses of a predetermined duration, such as clock pulses, for operating control circuitry in high-speed electronic computers and telephone systems, such as electronic time division multiplex telephone systems, continues to be a pressing problem. Switching speeds in such systems for transferring information may be as high as a few nanoseconds or $10^{-9}$ seconds. The problem of producing such pulses has been a long-standing one since transistorized flip-flops and blocking oscillators have been incapable of producing such pulses owing to the necessary regeneration time involved in the operation of their circuits. For example, flip-flop circuits cannot become reset and thereafter set at the required speed to produce a high frequency train of substantially rectangular pulses.

Further difficulties of the prior art flip-flop circuits and blocking oscillators reside in the fact that distributed capacitance in the circuit distorts the shape of each pulse generated. Although this is not a pressing problem with prior art flip-flop circuits operating at their intended speeds, attempts to increase their speed to the nanosecond speed range results in pulse distortion which may be disastrous to high-speed computers and telephone systems. For example, a distorted control pulse may cause cross-talk in an electronic time division multiplex telephone system since there may be signal hangover from one channel into another channel in a time-shared highway of a telephone system.

Accordingly, it is a principal object of the present invention to provide a novel high speed pulse width control amplifier for generating identical pulses of a predetermined duration.

It is a specific object of the present invention to provide means for deriving clock pulses in response to the leading edge of periodic non-identical pulses of variable duration.

It is a further object of the present invention to provide a novel pulse width control amplifier for generating a high frequency rectangular pulse train having a high duty cycle.

It is yet a further object of the present invention to provide a novel pulse width control amplifier that may be utilized to convert a variable input pulse to an output pulse of a given predetermined duration in response to the leading edge of each input pulse and having a duration less than the duration of each input pulse.

It is still a further object of the present invention to provide for the generation of high energy identical pulses for operating high speed switching circuits.

The invention, both as to its organization and method of operation, together with further objects and advantages thereof, will best be understood by reference to the following specification, taken in conjunction with the accompanying drawing, in which.

Figure 1:
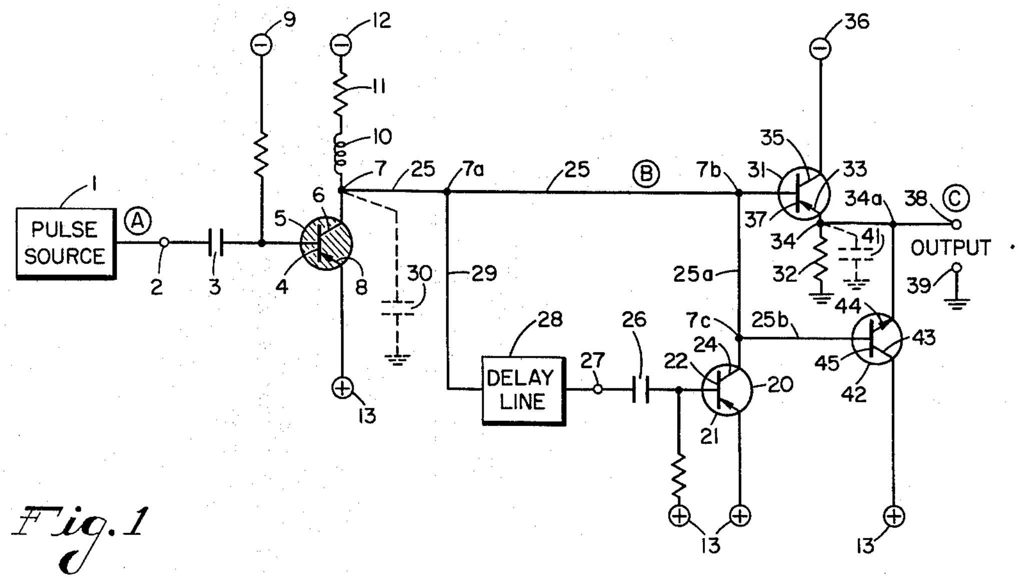
FIG. 1 is a circuit diagram illustrating the present invention.
Figure 2:
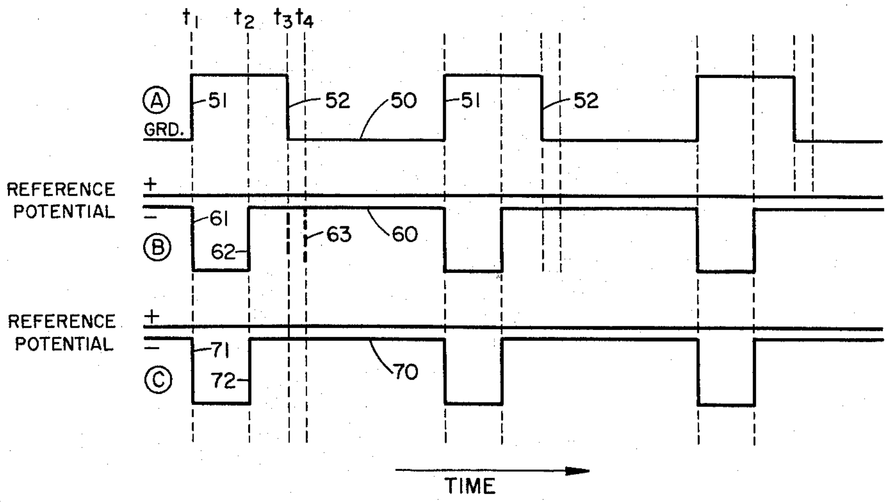
FIG. 2 is a timing diagram of a pulse waveform at different circuit points in the circuit of FIG. 1.

Referring now to FIG. 1 of the drawings, there is shown at 1 a source of periodic substantially rectangular input pulses which may be of variable duration illustrated at A in FIG. 2. Pulse source 1, as illustrated in FIG. 2, generates a train of positive-going pulses. The pulse train from source 1 is introduced to input terminal 2 of the pulse width control amplifier through a D.C. blocking capacitor 3 to a base electrode 4 of transistor 5. Transistor 5 may be a P-N-P type which includes a collector electrode 6 connected to a junction 7 and an emitter electrode 8 connected to a source of reference potential 13 or positive potential. The base electrode 4 is returned to a source of negative potential 9 so that transistor 5 is normally forward biased to conduction or in a low impedance state. The collector electrode 6 is connected in series to an inductance 10, a resistance 11, and a source of negative potential 12 through junction 7. Since transistor 5 is normally forward biased into conduction or at a very low impedance state, junction 7 is substantially at the reference potential 13. However, when transistor 5 is back biased by the application of the leading edge of a positive-going pulse from pulse source 1, it is triggered into a very high impedance or substantially non-conductive state so that junction 7 is substantially at the same negative potential as the source of negative potential 12.

The pulse width control amplifier further includes a transistor 20, such as a P-N-P type, similar to transistor 5, having an emitter electrode 21 connected to the reference potential 13 and a base electrode 22 returned to a source of positive potential so that transistor 20 is back biased and is normally in a nonconductive or high impedance state when the pulse width control amplifier is in the quiescent state. The collector electrode 24 of transistor 20 is connected in parallel with collector electrode 6 of transistor 5, so that the emitter-collector circuits of transistors 5 and 20 are connected in parallel with the series-connected inductance 10, resistance 11 and source of negative potential 12 at junction 7. Collector electrode 24 of transistor 20 is connected at junction 7*c* through to junctions 7, 7*a* and 7*b* over conductors 25 and 25*a*. The base electrode 22 of transistor 20 is connected in series to a D.C. blocking capacitor 26 and to an output terminal 27 of delay line 28. The input of delay line 28 is connected to junction 7*a* by conductor 29.

Junctions 7, 7*a*, 7*b* and 7*c*, in accordance with the invention, are substantially at the same point B and are considered the output junction for transistors 5 and 20.

Delay line 28 may be any one of the conventional type of delay networks which can delay a change in potential or the leading edge of a pulse for a predetermined time. The amount of time delay of the delay line 28 is a given predetermined time duration which is less than the pulse width or time duration of each pulse from pulse source 1.

At 30 there is shown in phantom view by dotted lines distributed capacitance to ground of the circuit just described. Distributed capacitance 30 is shown connected at junction 7 in parallel with transistors 5 and 20 to ground.

The pulse width control amplifier further includes a third transistor 31 and load resistance 32 connected in a transistor emitter follower configuration. Transistor 31 is of the P-N-P type and includes an emitter electrode 33 connected to load resistance 32 at junction 34 and a collector electrode 35 connected to a source of negative potential 36. The base electrode 37 of transistor 31 is connected to junction 7*b*. Transistor 31 is normally in the high impedance state when junction 7*b* is substantially at the reference potential 13 and forward biased into conduction or the low impedance state in response to a negative-going pulse or negative potential at junction 7*b*.

Output terminals 38 and 39 provide an external connection for the pulse waveform shown at C in FIG. 2. Output terminal 38 is connected to junction 34 by a conductor 40. Terminal 39 is shown connected to ground. Distributed capacitance 41 shown in dotted lines is connected between junction 34 and ground. Distributed capacitances 41 and 30 do not form part of this invention and are merely illustrated to show that energy is stored each time transistors 5 and 31 are forward biased into the conductive state. In accordance with the invention, a low impedance switch, such as a fourth transistor 42, is included to discharge any energy stored in the distributed capacitance 41 at the same time transistor 31 is back biased or in the high impedance state. Transistor 42 includes a collector electrode 43 connected to reference potential 13 and an emitter electrode 44 connected to junction 34 in series with the emitter-collector circuit of transistor 31 and source of negative potential 36. The emitter-collector circuit of transistor 42 is connected in parallel to load resistance 32 and distributed capacitance 41 between junctions 34, 34*a* and ground so as to bypass the load resistance 32.

The mode of operation of the pulse width control amplifier will be understood from the following description with reference to FIG. 2 in which line 50 shows a potential variation with time at input terminal 2 or point A, line 60 shows the potential variation with time at junctions 7, 7*a*, 7*b* and 7*c* illustrated by a single point B, and line 70 shows the potential variation with time at junctions 34, 34*a* and output terminal 38 illustrated as point C in the pulse width control amplifier. The pulse source 1 supplies periodic nonidentical substantially rectangular positive-going input pulses to input terminal 2. Each input positive-going pulse supplied by the pulse source 1 has at least a given pulse width or time duration which is less than or equal to twice the predetermined time delay of the delay line 28. The reason for this relationship will be seen as the operation of the pulse width amplifier proceeds. Each input pulse from pulse source 1 has a leading edge 51 and a trailing edge 52 which may occur, for example, at times $t_1$ and $t_3$, respectively. The frequency of the input pulses from pulse source 1 may be 15 megacycles, although some other preselected higher or lower value of frequency may be chosen.

Just prior to the application of a positive input pulse to input terminal 2, transistors 5 and 42 are forward biased into the low impedance state so that points B and C are at the reference potential. Transistor 20 at this time is back biased into the high impedance state by the positive potential supplied by source 23 and the emitter 21 which is connected to reference potential 13. Thus, just prior to the application of a positive-going input pulse, the pulse width control amplifier is in the quiescent state and has a steady state reference potential output.

When a positive-going pulse arrives at input terminal 2 from pulse source 1 at time $t_1$, the positive-going leading edge 51 of the input pulse triggers transistor 5 into the high impedance state, whereby junction 7 along with junctions 7*a*, 7*b* and 7*c* change from the reference potential to the negative potential of source 12. This sudden change in potential forms the leading edge 61 of a newly generated second pulse shown by line 60 in FIG. 2. The negative potential value at junctions 7, 7*a*, 7*b* and 7*c* has substantially the same negative potential of source 12. The leading edge 61 and negative potential on junction 9 turns on and keeps transistor 31 into the low impedance state, driving junction 34 to substantially the same negative potential value of negative source 36, generating a leading edge 71 of a newly generated third pulse shown by line 70 in FIG. 2. At time $t_1$, transistor 42 is back biased by the leading edge 61 and the negative potential at junctions 7*b* and 7*c* so that the potential of negative source 36 is placed across load resistance 32 and distributed capacitance 41.

The leading edge 61 of the second pulse at junctions 7, 7*a*, 7*b* and 7*c* at time $t_1$ is also applied to delay line 28 over conductor 29 and delayed in the delay line 28 for the predetermined delay time $t_2$ determined, of course, by the delay line 28. After the predetermined delay time $t_2$, the change in negative potential or leading edge 61 is applied to the base electrode 22 of transistor 20. In response to the leading edge 61 or change in negative potential, transistor 20 is forward biased into conduction or the low impedance state immediately returning junctions 7, 7*a*, 7*b* and 7*c* to the original reference potential, thus forming a positive-going trailing edge 62 of the pulse waveform 60. At time $t_2$, any energy stored in the distributed capacitance 30 is quickly discharged through the low impedance transistor 20. The positive-going trailing edge 62 of the pulse waveform shown by line 60 back biases transistor 31 into the high impedance state and forward biases transistor 42 back into the low impedance state, discharging any stored energy in the distributed capacitance 41. By back biasing transistor 31 and forward biasing transistor 42, junctions 34, 34*a* and output terminal 38, represented as point C, return to the original reference potential. The sudden discharge of the energy stored in the distributed capacitance 41 by the low impedance transistor 42 forms a trailing edge 72 of the output pulse waveform, as shown by line 70 in FIG. 2. The trailing edge 72 of the output pulse is substantially free of any transient effects due to the distributed capacitance 41. The pulse width or time duration of the output pulse is equal to the delay time of the delay line 28. At time $t_2$, the positive-going trailing edge 62 is applied to delay line 28.

At time $t_3$, the trailing edge 52 or negative-going edge of the input pulse forward biases transistor 5 back into the conductive state and provides an alternate low impedance path to the reference potential from junction 7. However, since the impedances of transistors 5 and 20 are substantially equal, junction 7 along the junctions 7*a*, 7*b* and 7*c* remain at the reference potential. A further action takes place at time $t_3$. The trailing edge 62 of pulse waveform 60 is recirculating through delay line 28 and at time $t_4$ which is twice the time delay of the delay line 28 arrives at the base electrode 22 and back biases transistor 20 into the high impedance state. However, junction 7*c* along with junctions 7, 7*a* and 7*b* remain at the reference potential since transistor 5 has already been forward biased into the low impedance state. The pulse width control amplifier is now ready for a subsequent input pulse from pulse source 1.

It should be noted that the trailing edge 52 of the input pulse from pulse source 1 occurs at time $t_3$ preceding the recirculated delay trailing edge 62 of pulse waveform 60, otherwise we would have another short pulse occurring at the time $t_4$.

In accordance with the invention, no regenerative time is required since the base electrodes 37 and 45 of transistors 31 and 42, respectively, are connected effectively at a common point B and respond to the same leading and trailing edges of a second pulse shown by line 60 to form an amplified output pulse having corresponding leading and trailing edges of the second pulse.

The present invention has been illustrated for positive-going input pulses from pulse source 1; however, it should be obvious to one skilled in the art that the invention will work equally as well for negative-going input pulses by selecting N-P-N transistors for P-N-P transistors and supplying appropriate biasing potentials to the selected transistors.

The reference potential may be ground potential in which case the leading edge 61 of pulse waveform 60 renders transistor 31 conducting and transistor 42 nonconducting. The trailing edge 62 of pulse waveform 62 renders transistor 31 nonconducting and transistor 42 conducting. In the quiescent state or when junctions 7, 7*a*, 7*b* and 7*c* are at ground potential, transistors 31 and 42 are nonconducting.

While there has been shown and described a specific embodiment of the invention, other modifications will readily occur to those skilled in the art. It is not, therefore desired that this invention be limited to the specific arrangement shown and described, and it is intended in the appended claims to cover all modifications within the spirit and scope of the invention.

What is claimed is:

1. Apparatus for deriving rectangular pulses having a predetermined duration from rectangular pulses having a duration greater than said predetermined duration, said apparatus comprising a common point, impedance means coupling said common point to a point of fixed operating potential with respect to a point of reference potential, an output terminal, an emitter follower having its input coupled to said common point and its output coupled to said output terminal, first and second control devices each having a current-emitting electrode, a current-collecting electrode and a control electrode, each of said first and second control devices having its current collecting-current emitting path coupled between said common point and said point of reference potential, each of said first and second control devices when conducting having a value of impedance which is low relative to the value of impedance of said impedance means and when non-conducting having a value of impedance which is high relative to the value of impedance of said impedance means, means for biasing said first control device to be normally conducting, means for biasing said second control device to be normally non-conducting, a pulse source coupled to said control electrode of said first control device for applying rectangular pulses having a duration greater than said predetermined duration as an input to said first control device to effect the non-conducting thereof for the during of each input rectangular pulse, a delay means providing a time delay between the input and output thereof equal to said predetermined duration, means for coupling the input of said delay means to said common point, means for coupling the output of said delay means to said control electrode of said second control device to effect the conducting thereof for the duration of a delayed pulse applied as an input thereto from the output of said delay means, a third control device having a control electrode, a current-emitting electrode and a current-collecting electrode, means for coupling the current collecting-current emitting path of said third control device between said output terminal and said point of reference potential, and means for coupling the control electrode of said third control device to said common point, said third control device being biased for non-conducting solely in response to both said first and second control devices being non-conducting, said third control device providing a virtual short circuit between its current-collecting electrode and its current-emitting electrode solely when it is conducting.

2. The apparatus defined in claim 1, wherein said delay means is a delay line.

3. The apparatus defined in claim 1, wherein the duration of each of said input rectangular pulses is at most equal to twice said predetermined duration.

4. The apparatus defined in claim 1, wherein said impedance means comprises a serially-connected resistance and inductance.

References Cited by the Examiner

UNITED STATES PATENTS

| | | | |
|---|---|---|---|
| 3,054,072 | 9/1962 | Beaulieu et al. | 307—88.5 |
| 3,071,732 | 1/1963 | Martin et al. | 307—88.5 |

DAVID J. GALVIN, *Primary Examiner.*

ARTHUR GAUSS, *Examiner.*